Jan. 31, 1939.  E. E. YOUNG  2,145,537
ANIMAL TRAP
Filed July 13, 1937   2 Sheets-Sheet 1
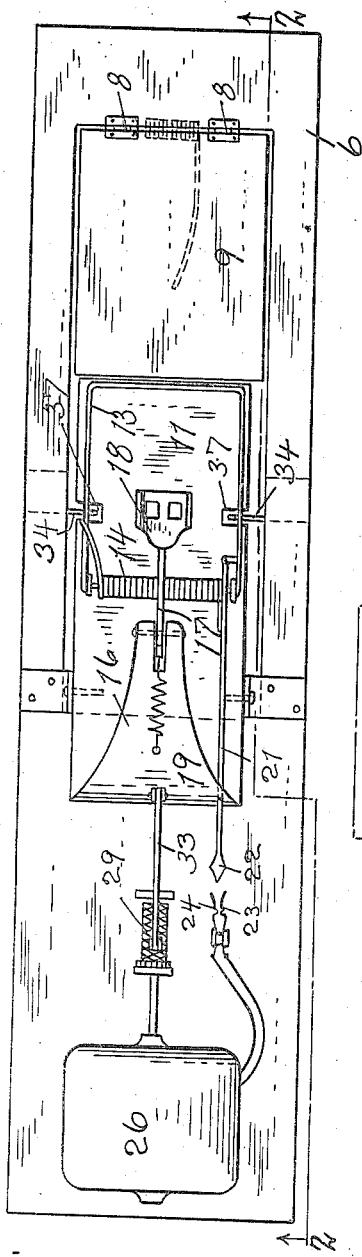
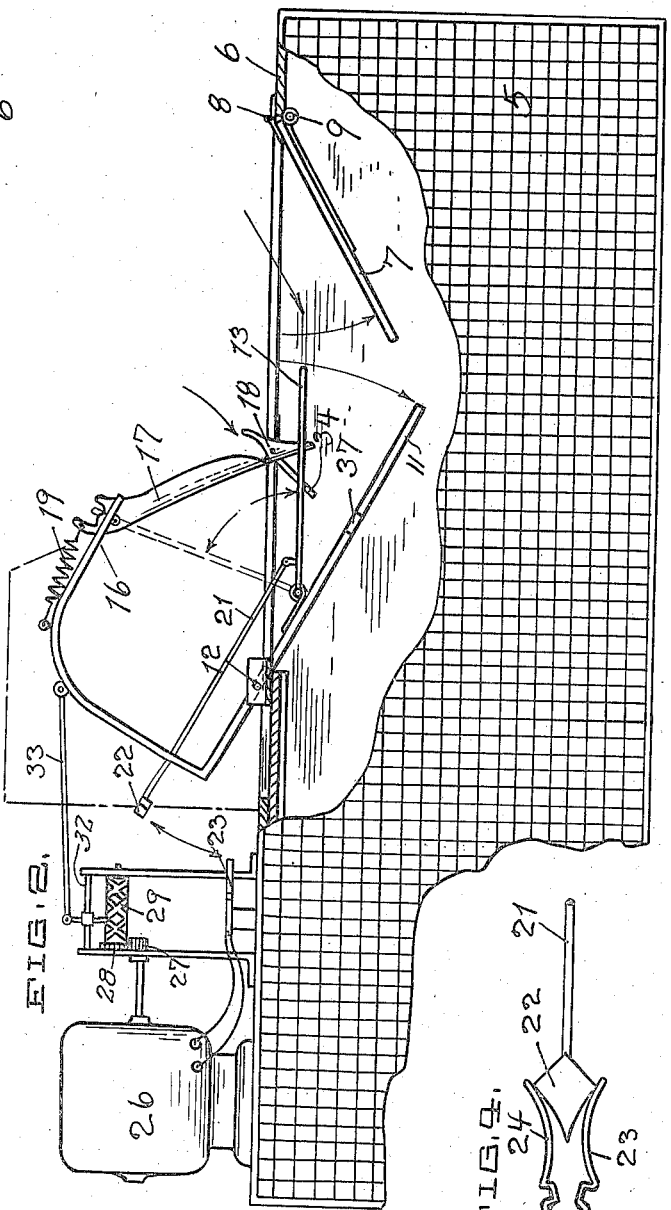
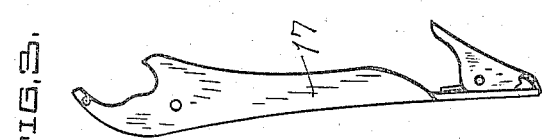
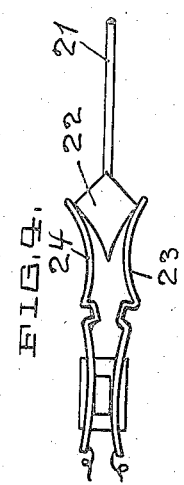
INVENTOR.
EUGENE E. YOUNG.
BY
ATTORNEYS.

Jan. 31, 1939.   E. E. YOUNG   2,145,537
ANIMAL TRAP
Filed July 13, 1937   2 Sheets-Sheet 2
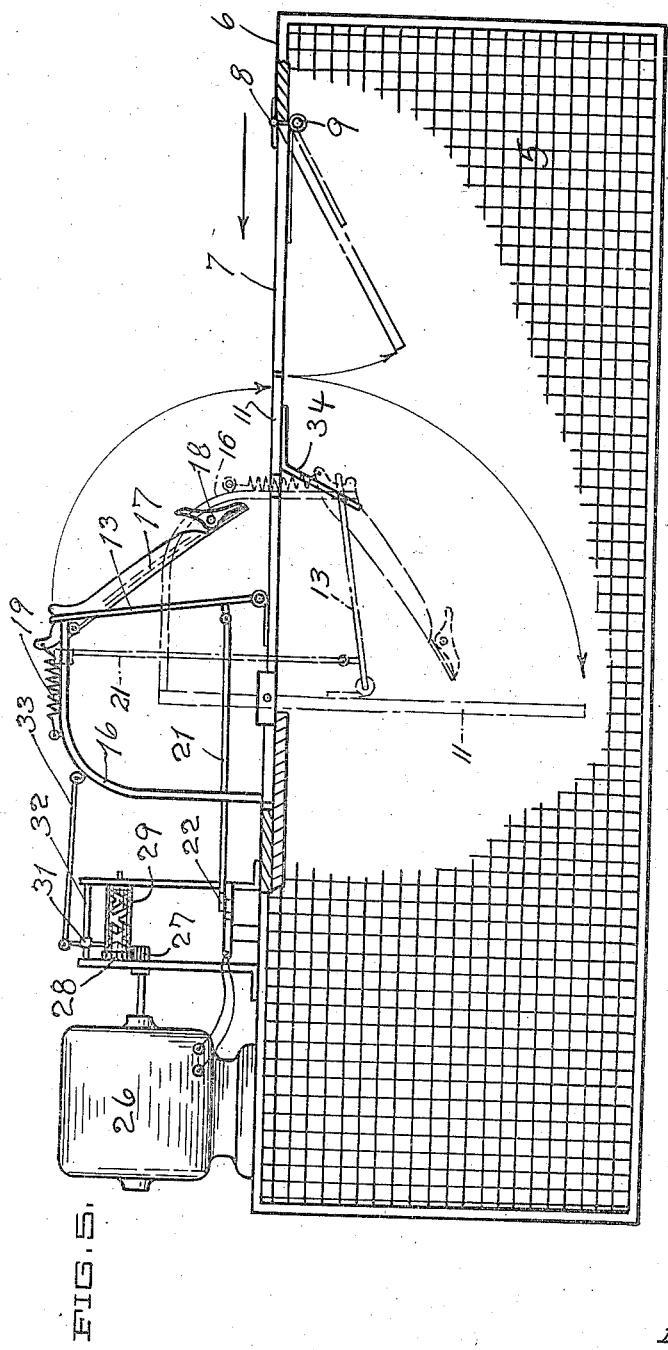
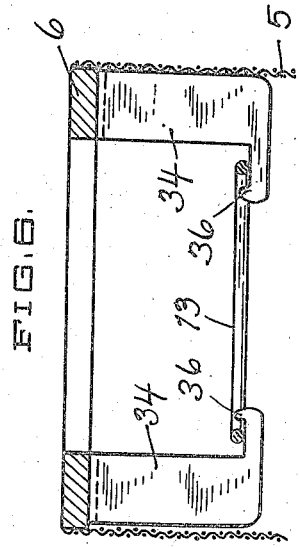
INVENTOR.
EUGENE E. YOUNG.
BY
ATTORNEYS.

Patented Jan. 31, 1939

2,145,537

UNITED STATES PATENT OFFICE 2,145,537

ANIMAL TRAP

Eugene Edward Young, San Diego, Calif.

Application July 13, 1937, Serial No. 153,401

2 Claims. (Cl. 43—73)

This invention relates to improvements in animal traps and has particular reference to a trap which will catch the animal, deposit the same in the trap, and reset itself, preferably killing the animal during the catching operation.

A further object is to produce a device of this character which is readily transportable, one which is simple to operate, and one which will be capable of disposing of a large number of animals, such as rodents, in rapid succession.

Other objects and advantages will be apparent during the course of the following description.

In the accompanying drawings forming a part of this specification and in which like numerals are employed to designate like parts throughout the same, Fig. 1 is a top plan view of my trap, showing the trap in the act of tipping and having a portion thereof broken away;

Fig. 2 is a side elevation of my device, portions thereof being broken away;

Fig. 3 is a side elevation on an enlarged scale of the trigger;

Fig. 4 is an enlarged fragmentary top plan view of the circuit breaker;

Fig. 5 is a view similar to Fig. 2, showing the starting position in full lines and the final position in dotted lines; and Fig. 6 is a fragmentary cross sectional view showing the reset levers.

The average animal trap of the snap variety consists of a substantially U-shaped part, which is held in retracted position with a catch; and when the animal removes the bait from the trap, the catch springs and allows the U-shaped member to forcibly contact the animal, killing the same instantly and so holding the animal until it is manually removed. This kind of trap needs constant watching and will only function once, while with my trap, the same will catch the animal, kill the same, and deposit it in a receptacle, resetting itself, ready for the next operation.

In the accompanying drawings wherein for the purpose of illustration is shown a preferred embodiment of my invention, the numeral 5 designates a cage-like receptacle having a solid top 6, forming a platform through which is cut a door 7, pivoted as at 8 and closed by a spring 9. At 11 I have shown a similar door-like piece, pivoted as at 12 and having mounted thereon a U-shaped member 13, actuated by the spring 14 so as to normally lie in the position of Fig. 1. A support 16 has secured thereto a latch 17, provided with a bait holder 18. A spring 19 normally holds the bait holder in its proper position to receive the U-shaped member 13 when it is swung from the position of Fig. 1 to that of Fig. 5. Secured to the U-shaped member is a rod 21 which has a head 22 adapted to pass between the contacts 23 and 24, which contacts are connected to a motor 26, which rotates a gear 27, meshing with a gear 28, which gear is secured to a drum 29 having grooves formed therein. The grooves are so formed that a follower 31, moving along a guide 32, will travel back and forth during a predetermined movement or revolutions of the drum 29. This follower 31 is connected to a pull rod 33 which is in turn pivoted to the support 16. Mounted within the receptacle 5 is a pair of resetting levers 34 which have hooked extremities 36 extending into the path of movement of the door 11. By viewing Fig. 1 it will be noted that these levers 34 may pass through slots 37 formed in the door.

As a result of this construction, when the trap is baited and set, as shown in Fig. 5, the head 22 will be between the contacts 23 and 24, and the motor will be idle. Should an animal attempt to take the bait through the holes in the bait holder, (which is so arranged that the animal may smell the bait, but the bait is exceedingly difficult to reach) then the latch 17 will move against the tension of the spring 19, and the U-shaped member 13 will snap downwardly, killing the animal.

It is assumed that the animal will be occupying a position upon both the doors 7 and 11. As soon as the U-shaped member 13 springs, the head 22 will be withdrawn from between the contacts 23 and 24, and when engaging each other, will cause an electrical circuit to the motor 26; and as the motor revolves, the door 11 and its associated parts will be moved first to the position of Fig. 2, the animal forcing the door 7 also downwardly; and when the trap reaches the position of Fig. 2, the reset levers 34 will engage the U-shaped member 13 and stop its further movement. However, the door 11 will continue its movement down to the dotted line position of Fig. 5. This will bring the U-shaped member into engagement with the latch 17, and the trap will thus be reset. As the motor continues to rotate the drum 29, the parts will return to the starting position, and the head 22 will again interrupt the circuit, and the parts will remain stationary until the trap is again sprung.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim:—

1. In a device of the character described, the combination of a receptacle and a pair of door members hinged above said receptacle, a spring actuated member secured to one of said doors and adapted to impinge upon an animal standing on said doors, means for holding and releasing said spring actuated member, and means for resetting said spring actuated member after an animal has been contacted thereby and deposited in said receptacle.

2. In a device of the character described, the combination of a receptacle and a pair of door members hinged above said receptacle, a spring actuated member secured to one of said doors and adapted to impinge upon an animal standing on said doors, means for holding and releasing said spring actuated member, and means for resetting said spring actuated member after an animal has been contacted thereby and deposited in said re-receptacle, said means including a pair of projecting reset levers mounted below said doors, whereby the pivoting of one of said doors causes said reset levers to engage said spring actuated member for pivotal movement into engagement with said holding and releasing means.

EUGENE EDWARD YOUNG.